Dec. 25, 1928.
A. CROSSLEY
1,696,627
PIEZO ELECTRIC CRYSTAL
Filed Oct. 12, 1925
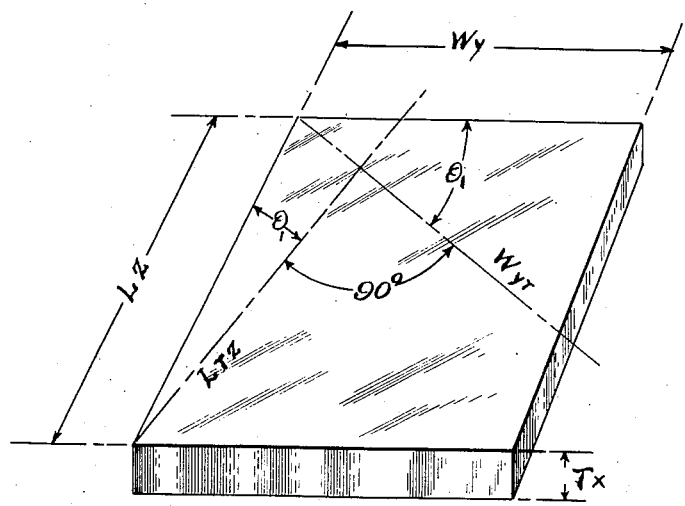
Inventor
Alfred Crossley,
By Robert A. Lavender
Attorney Patented Dec. 25, 1928.

1,696,627

UNITED STATES PATENT OFFICE.

ALFRED CROSSLEY, OF WASHINGTON, DISTRICT OF COLUMBIA, ASSIGNOR TO WIRED RADIO, INC., OF NEW YORK, N. Y., A CORPORATION OF DELAWARE.

PIEZO-ELECTRIC CRYSTAL.

Application filed October 12, 1925. Serial No. 62,200.

My invention relates broadly to a method of manufacturing piezo electric crystals and more particularly to the shaping of a piezo electric crystal element in the form of a parallelopiped according to a trigonometric law.

One of the objects of my invention is to provide a method for manufacturing piezo electric crystals by which crystals may be produced which exhibit maximum piezo electric properties.

Another object of my invention is to provide a system of manufacturing piezo electric crystals by which piezo electric material which normally might be discarded as not possessing sufficient piezo electric properties may be cut into piezo electric crystals in the shape of a parallelopiped which will possess desirable oscillating qualities.

Heretofore I have discovered jointly with Albert H. Taylor the fact that piezo electric crystals develop a maximum amplitude of oscillation where there is an integral mathematical relation between the geometrical axes of the piezo electric crystals where the crystals have been cut along a geometrical axis that makes a zero angle to the optical axis of the piezo electric material. I find however that where crystals have been cut along an axis which makes a different angle from the zero angle with respect to the optical axis, that the whole number mathematical relationship of the geometrical axes can no longer be followed in order to obtain the maximum piezo electric effect from a piezo electric crystal. I have discovered a trigonometric means for fixing the dimensions of the piezo electric crystal with respect to the angle between one geometric axis of the crystal and the optical axis.

Referring to the drawing, I have shown a piezo electric crystal in the form of a parallelopiped which has been cut from the original natural material in such manner that the optical axis is off from the usual zero angle by an amount equal to $\theta$ degrees. In other words, the true optical axis is not parallel with the side $L_z$ but is at an angle to this side and is shown by the line $L_{TZ}$. There are, therefore, two longitudinal dimensions, one the apparent dimension, or $L_z$, and the other the true dimension or $L_{TZ}$, from which it can be assumed that knowing the length of $L_z$ and the angle $\theta$, the length of $L_{TZ}$, or the true optical axis can be calculated. This computation can then be used by taking the $L_z$ dimension and dividing it by the cosine of the angle $\theta$, and thus obtaining the length of $L_{TZ}$.

In the manufacture of piezo electric crystals for operation as constant frequency oscillators, it is desirable that crystals of the maximum oscillatory amplitude be produced. It is necessary to find the true length of the crystal, it being understood that the dimension of the geometrical axis $T_x$ is not changed in this type of crystal. From previous knowledge of the natural crystal structure it is known that a 90 degree relationship exists between the geometrical axes and such being the case it can be assumed that any change in the optical axis will also affect the other geometric axis. Therefore if the optical axis is off $\theta$ degrees from the side $L_z$ then the $W_Y$ axis must be off an identical amount as is shown in the drawing by the relation of the lines $W_Y$ and $L_z$. It is therefore to be noted that the true axis $W_{YT}$ is therefore longer than the side $W_Y$ and is equal to $$\frac{W_Y}{\cos \theta_1}$$

This relationship holds true and is applicable so long as the two sides make a right angle with each other. Having determined the true length of the lateral axis the integral relationship $\frac{W_Y}{T_x}$ theory can now be applied to the crystal to obtain maximum amplitude of the piezo electric effect. Thus when the maximum output or piezo electric effect is desired from any crystal which is cut at an angle to the optical axis, the crystal is ground so that the lateral dimension is equal to the thickness dimension times an integer, times the cosine of the angle.

An example of grinding a crystal of this type may be cited as follows: A crystal having a 30 degree optical angle, a thickness dimension of 5 mm., and a dimension $W_Y$ of 25 mm. is to be ground for maximum output. From this data we can determine the exact dimension of the side $W_Y$ by multiplying 5 mm., the thickness dimension, by the cosine of 30 degrees, (.8660) times an integer which will produce a dimension smaller than the present 25 mm. $W_Y$ dimension. This is completed as follows:—5 mm. x .8660 x 5 or 21.65 mm., which is the correct dimension of the $W_Y$ side of the crystal. The crystal is then ground down to 21.65 mm. on the $W_Y$ dimension and tested for output. If the output is not as great as should be expected from comparison with similar crystals, then an infinitesimal amount may be ground off on the $L_z$ dimension until maximum oscillatory output or piezo electric effect is obtained.

This new system of manufacturing piezo electric crystals has been instrumental in salvaging a great number of crystals which would otherwise have been scrapped. Results show that these "off" angle crystals are actually better oscillators than the zero angle crystals. By zero angle crystals I mean those in which one of the geometric axes may be parallel with the optical axis.

By the term "off angle crystal" I have reference to a quartz plate in the form of a parallelopiped characterized by the fact that of those faces which extend in the direction of the optic axis, two oppositely disposed, are oblique to the optic axis. It will be understood that the sides of the crystal are ground parallel and that the dimension of one side is directly proportional to a trigonometric function of the angle between an opposite side, of the dimension along the optical axis, the thickness of the crystal and an integer.

What I claim and desire to secure by Letters Patent of the United States is as follows:—

1. An off angle piezo electric quartz crystal comprising a parallelopiped having a pair of its sides cut at an angle to the optical axis thereof and the other pair of its sides ground to a dimension directly proportional to the cosine function of the angle between the optical axis and one of said first mentioned sides 2. An off angle piezo electric quartz crystal comprising a parallelopiped, having a pair of its sides cut at an angle to the optical axis thereof and having another pair of its sides ground to a dimension directly proportional to the value of the cosine of angle between the optical axis and the first mentioned pair of sides of said crystal multiplied by a whole number.

3. An off angle piezo electric quartz crystal comprising a parallelopiped having a pair of its sides cut at an angle to the optical axis thereof and having another pair of its sides ground to a dimension equal to the product of the cosine function of the said angle between the optical axis and said first mentioned pair of sides, the thickness of the crystal and an integer.

4. An off angle piezo electric quartz crystal comprising a parallelopiped having a pair of its sides cut at an angle to the optical axis thereof and having another pair of its sides ground to a dimension equal to the product of the cosine of the angle between the optical axis and said first mentioned pair of sides, the thickness of the crystal and an integer.

5. A piezo electric quartz crystal comprising a parallelopiped having a plurality of faces extending in the direction of the optic axis of said crystal, two of said faces being oppositely disposed and extending at an oblique angle to the optic axis, said crystal having another part of its faces ground to a dimension equal to the product of the thickness of the crystal, a whole number and the value of the cosine function of the angle between the optic axis and said first mentioned pair of faces.

ALFRED CROSSLEY.